(12) United States Patent
Ryu (10) Patent No.: US 6,295,386 B1
(45) Date of Patent: Sep. 25, 2001

(54) APPARATUS AND A METHOD FOR CORRECTING IMAGE ERRORS IN A SHUTTLE TYPE OF A SCANNER

(75) Inventor: Yeong-eek Ryu, Kyonggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/190,280

(22) Filed: Nov. 13, 1998

(30) Foreign Application Priority Data

Nov. 13, 1997 (KR) .................................................. 97-59620

(51) Int. Cl.$^7$ ...................................................... G06K 9/32
(52) U.S. Cl. ............................................. 382/294; 382/317
(58) Field of Search ............................... 347/19; 250/557; 702/150, 151; 399/151; 356/138; 235/454, 470; 359/197; 382/218, 286–287, 289, 294, 312, 317, 318, 321; 358/1.12, 1.1, 1.5, 1.18, 1.9, 505, 524, 406, 444, 474, 494, 496, 504, 488, 498, 298

(56) References Cited

U.S. PATENT DOCUMENTS

| | | | |
|---|---|---|---|
| 4,292,621 | * 9/1981 | Fuller | 358/496 |
| 4,724,330 | * 2/1988 | Tuhro | 358/406 |
| 4,985,930 | * 1/1991 | Takeda et al. | 382/289 |
| 5,289,208 | 2/1994 | Haselby | 347/19 |
| 5,297,017 | 3/1994 | Haslby et al. | 347/19 |
| 5,648,801 | * 7/1997 | Beardsley et al. | 358/298 |
| 5,732,162 | * 3/1998 | Curry | 382/294 |
| 6,039,427 | * 3/2000 | Kanome | 347/19 |

\* cited by examiner

Primary Examiner—Timothy M. Johnson
(74) Attorney, Agent, or Firm—Robert E. Bushnell, Esq.

(57) ABSTRACT

An apparatus and a method for correcting image errors in a shuttle type of a scanner, in which a predetermined pattern is printed on a recordable paper. Then the recordable paper is positioned at an initial position, and the printed pattern on the recordable paper is scanned and scanned pattern data are stored. The pattern data are then compared to preset reference data so as to calculate an amount of image errors. Continuously, the amount of corrections corresponding to the amount of the image errors are determined from a preset correcting table and the amount of the corrections are stored. Finally, a document is scanned and scanned document data are corrected by the stored amount of corrections. Accordingly, the stable data can be obtained by correcting the image errors in the shuttle type of the scanner in such a manner as described above.

17 Claims, 12 Drawing Sheets

| NO \ Errors | 1 | 2 | 3 | 4 | 5 | 6 | 7 |
|---|---|---|---|---|---|---|---|
| 1 | 0 | 0 | 0 | 0 | 0 | 0 | 0 |
| 2 | 0 | 0 | 0 | 0 | 0 | 0 | 0 |
| 3 | 0 | 0 | 0 | 0 | 0 | 0 | 0 |
| 4 | 0 | 0 | 0 | 0 | 0 | 0 | 0 |
| 5 | 0 | 0 | 0 | 0 | 0 | 0 | 0 |
| 6 | 0 | 0 | 0 | 0 | 0 | 0 | 0 |
| 7 | 0 | 0 | 0 | 0 | 0 | 0 | 0 |
| 8 | 0 | 0 | 0 | 0 | 0 | 0 | 0 |
| 9 | 0 | 0 | 0 | 0 | 0 | 0 | 0 |
| 10 | 0 | 0 | 0 | 0 | 0 | 0 | 0 |
| 11 | 0 | 0 | 0 | 0 | 0 | 0 | 0 |
| 12 | 0 | 0 | 0 | 0 | 0 | 0 | 0 |
| 13 | 0 | 0 | 0 | 0 | 0 | 0 | 0 |
| 14 | 0 | 0 | 0 | 0 | 0 | 0 | 0 |
| 15 | 0 | 0 | 0 | 0 | 0 | 0 | 0 |
| 16 | 0 | 0 | 0 | 0 | 0 | 0 | 0 |
| 17 | 0 | 0 | 0 | 0 | 0 | 0 | 0 |
| 18 | 0 | 0 | 0 | 0 | 0 | 0 | 0 |
| 19 | 0 | 0 | 0 | 0 | 0 | 0 | 0 |
| 20 | 0 | 0 | 0 | 0 | 0 | 0 | 0 |

FIG. 7B

| NO \ Errors | 1 | 2 | 3 | 4 | 5 | 6 | 7 |
|---|---|---|---|---|---|---|---|
| 21 | 0 | 0 | 0 | 0 | 0 | 0 | 1 |
| 22 | 0 | 0 | 0 | 0 | 0 | 0 | 1 |
| 23 | 0 | 0 | 0 | 0 | 0 | 1 | 1 |
| 24 | 0 | 0 | 0 | 0 | 0 | 1 | 1 |
| 25 | 0 | 0 | 0 | 0 | 0 | 1 | 1 |
| 26 | 0 | 0 | 0 | 0 | 0 | 1 | 1 |
| 27 | 0 | 0 | 0 | 0 | 0 | 1 | 1 |
| 28 | 0 | 0 | 0 | 0 | 1 | 1 | 1 |
| 29 | 0 | 0 | 0 | 0 | 1 | 1 | 1 |
| 30 | 0 | 0 | 0 | 0 | 1 | 1 | 1 |
| 31 | 0 | 0 | 0 | 0 | 1 | 1 | 1 |
| 32 | 0 | 0 | 0 | 1 | 1 | 1 | 1 |
| 33 | 0 | 0 | 0 | 1 | 1 | 1 | 1 |
| 34 | 0 | 0 | 0 | 1 | 1 | 1 | 1 |
| 35 | 0 | 0 | 0 | 1 | 1 | 1 | 1 |
| 36 | 0 | 0 | 0 | 1 | 1 | 1 | 1 |
| 37 | 0 | 0 | 0 | 1 | 1 | 1 | 1 |
| 38 | 0 | 0 | 0 | 1 | 1 | 1 | 1 |
| 39 | 0 | 0 | 0 | 1 | 1 | 1 | 1 |
| 40 | 0 | 0 | 1 | 1 | 1 | 1 | 1 |

FIG. 7C

| NO \ Errors | 1 | 2 | 3 | 4 | 5 | 6 | 7 |
|---|---|---|---|---|---|---|---|
| 121 | 1 | 2 | 2 | 3 | 4 | 5 | 6 |
| 122 | 1 | 2 | 3 | 3 | 4 | 5 | 6 |
| 123 | 1 | 2 | 3 | 3 | 4 | 5 | 6 |
| 124 | 1 | 2 | 3 | 3 | 4 | 5 | 6 |
| 125 | 1 | 2 | 3 | 3 | 4 | 5 | 6 |
| 126 | 1 | 2 | 3 | 3 | 4 | 5 | 6 |
| 127 | 1 | 2 | 3 | 3 | 4 | 5 | 6 |
| 128 | 1 | 2 | 3 | 3 | 4 | 5 | 6 |
| 129 | 1 | 2 | 3 | 4 | 4 | 5 | 6 |
| 130 | 1 | 2 | 3 | 4 | 4 | 5 | 6 |
| 131 | 1 | 2 | 3 | 4 | 4 | 5 | 6 |
| 132 | 1 | 2 | 3 | 4 | 4 | 5 | 6 |
| 133 | 1 | 2 | 3 | 4 | 4 | 5 | 6 |
| 134 | 1 | 2 | 3 | 4 | 5 | 5 | 6 |
| 135 | 1 | 2 | 3 | 4 | 5 | 5 | 6 |
| 136 | 1 | 2 | 3 | 4 | 5 | 5 | 6 |
| 137 | 1 | 2 | 3 | 4 | 5 | 5 | 6 |
| 138 | 1 | 2 | 3 | 4 | 5 | 6 | 6 |
| 139 | 1 | 2 | 3 | 4 | 5 | 6 | 6 |
| 140 | 1 | 2 | 3 | 4 | 5 | 6 | 6 |

FIG. 7D

| NO \ Errors | 1 | 2 | 3 | 4 | 5 | 6 | 7 |
|---|---|---|---|---|---|---|---|
| 141 | 1 | 2 | 3 | 4 | 5 | 6 | 7 |
| 142 | 1 | 2 | 3 | 4 | 5 | 6 | 7 |
| 143 | 1 | 2 | 3 | 4 | 5 | 6 | 7 |
| 144 | 1 | 2 | 3 | 4 | 5 | 6 | 7 |
| 145 | 1 | 2 | 3 | 4 | 5 | 6 | 7 |
| 146 | 1 | 2 | 3 | 4 | 5 | 6 | 7 |
| 147 | 1 | 2 | 3 | 4 | 5 | 6 | 7 |
| 148 | 1 | 2 | 3 | 4 | 5 | 6 | 7 |
| 149 | 1 | 2 | 3 | 4 | 5 | 6 | 7 |
| 150 | 1 | 2 | 3 | 4 | 5 | 6 | 7 |
| 151 | 1 | 2 | 3 | 4 | 5 | 6 | 7 |
| 152 | 1 | 2 | 3 | 4 | 5 | 6 | 7 |
| 153 | 1 | 2 | 3 | 4 | 5 | 6 | 7 |
| 154 | 1 | 2 | 3 | 4 | 5 | 6 | 7 |
| 155 | 1 | 2 | 3 | 4 | 5 | 6 | 7 |
| 156 | 1 | 2 | 3 | 4 | 5 | 6 | 7 |
| 157 | 1 | 2 | 3 | 4 | 5 | 6 | 7 |
| 158 | 1 | 2 | 3 | 4 | 5 | 6 | 7 |
| 159 | 1 | 2 | 3 | 4 | 5 | 6 | 7 |
| 160 | 1 | 2 | 3 | 4 | 5 | 6 | 7 |

FIG. 8

APPARATUS AND A METHOD FOR CORRECTING IMAGE ERRORS IN A SHUTTLE TYPE OF A SCANNER

CLAIM OF PRIORITY

This application makes reference to, incorporates the same herein, and claims all benefits accruing under 35 U.S.C §119 from an application entitled An Apparatus And A Method For Correcting Image Errors In A Shuttle Type Scanner earlier filed in the Korean Industrial Property Office on Nov. 13, 1997, and there duly assigned Serial No. 97-59620 by that Office.

BACKGROUND OF THE INVENTION

1. Field of the Invention

The present invention relates to an apparatus and a method for correcting image errors in a shuttle type of a scanner, and more particularly to an apparatus and a method for correcting image errors in a shuttle type of a scanner, in which are capable of correcting the image errors due to an alignment tolerance of the scanner and an inertia generated in a shuttle movement.

2. Description of the Prior Art

In a shuttle type of a scanner, a scanning head must be moved in a direction normal (orthogonal or perpendicular) to a direction in which a document is carried. This means that an alignment tolerance is a zero. The shuttle type of the scanner makes the scanning head move left to right or right to left (reciprocating movement of the head) while scanning an image on the document. Image errors can be generated in the scanned image due to a mechanical tolerance of the scanner.

The scanning head is mounted on a guide shaft so as to be guided while the scanning head is reciprocated along the guide shaft. The scanning head, however, inclines (skews) due to an inertia as it reciprocated along the guide shaft. While the document is scanned by the scanner, the scanned data have errors in that the image is inclined (skewed). Therefore, it is necessary to correct the image errors in the image data.

Figure 1:
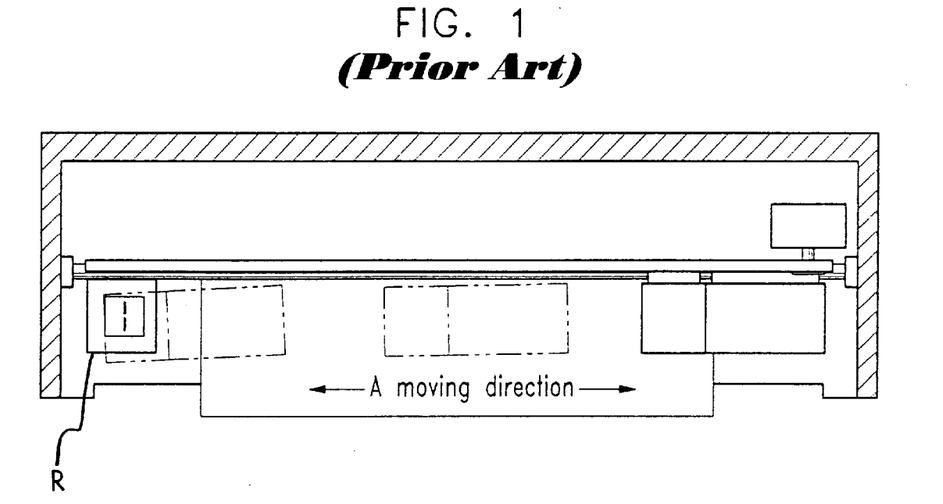
FIG. 1 shows an operation of a shuttle type of a scanner according to the conventional art.

In order to correct the image errors, according to the conventional art, a reference sticker R having a pattern is attached at an end portion of an effective scanning area in the scanner, as shown in FIG. 1, and the scanner scans, band by band, the pattern of the reference sticker R to detect an error between a first datum and a last datum of each band. Then, the scanned image data are corrected according to the detected error.

According to the conventional art, however, when the reference sticker R is attached at the end portion of the scanning area in the scanner in order to correct the image error generated during the scanning, it is impossible to correct an error which is generated during a process of attaching the reference sticker to the scanner. As a result, the error is continuously generated due to the original error in attaching reference sticker.

In order to correct the error due to failing to properly attach the reference sticker to the scanner, a precise apparatus is required to accurately attach the reference sticker to the scanner. Accordingly, the productivity of the scanner can be degraded and the manufacturing cost can be increased. If the reference sticker is contaminated, it is impossible to correct the image errors accurately. In order to prevent the reference sticker from being contaminated, the reference sticker must remain clean by attaching a cover thereby making the process of producing the scanner more complicated.

SUMMARY OF THE INVENTION

The present invention has been made to overcome the above described problem of the prior art. It is a first object of the present invention to provide a method for correcting image errors in a shuttle type of a scanner, in which a predetermined pattern is printed on a recordable paper which does not have data (blank paper) before scanning image data of a document, the printed pattern is scanned and the amount of image errors in the scanned pattern data are stored, and the image errors for the image data of the document are corrected by the amount of image corrections corresponding to the amount of the image errors.

It is a second object of the present invention to provide an apparatus for correcting image errors in a shuttle type of a scanner to achieve the first object of the present invention.

To accomplish the above objects of the present invention, according to the first aspect of the present invention, there is provided a method for correcting image errors in a shuttle type of a scanner which prints a predetermined pattern on a recordable paper; scans the predetermined pattern which is printed in the printing step and stores the pattern data; compares the pattern data with a preset reference data and calculates an amount of image errors; determines an amount of corrections needed corresponding to the amount of image errors from a correcting table which is preset and stores the amount of the corrections; and then scans a document and corrects scanned document data by the stored amount of the corrections.

In the printing step, a printing operation is performed by moving the recordable paper at a predetermined distance in a direction normal to a moving direction of a printer head in a state that the printer head stays at a predetermined position.

Preferably, the method according to the first aspect of the present invention further comprises moving the recordable paper in a reverse direction against the proceeding direction of the recordable paper in the printing step and setting the recordable paper in an initial position after the printing operation is completed.

The method according to the first aspect of the present invention further comprises moving the printer head at a predetermined distance in a predetermined direction, wherein the printing step and the initial position setting step are repeatedly performed until the pattern in a scanning band is printed on the recordable paper after the moving step. The predetermined pattern has a straight line, preferably the predetermined pattern is defined to be distinguished from a general data and has a plurality of straight lines. The reference data are data when the predetermined pattern is scanned without errors. In the step of correcting the scanned document data, the scanned document data are rasterized and the rasterized document data are all corrected by the amount of the corrections. The scanned document data are rasterized in the state that the scanned document data divided into lines in a subscanning direction are preferably divided into lines in a main scanning direction. A point at which the printing to storing steps are performed includes a starting point at which a scanning operation is started. A point at which the printing to storing steps are performed includes a point at which a requirement of an user is received.

According to a second aspect of the present invention, there is provided an apparatus for correcting image errors in a shuttle type of a scanner, having a scanning module for scanning a document data recorded on a document and a predetermined pattern formed on a recordable paper; a printer head for printing the predetermined pattern on the recordable paper; a control section for controlling an operation of the scanning module to perform a series of scanning operations while controlling an operation of a printer head to perform printing; a ROM for storing a program so that the control section controls the scanning module and the printer head according to the desired sequence while storing a correcting table and a preset reference data to correct errors of scanned image data; and a RAM for storing the image data which are scanned by means of the scanning module, wherein the control section enables the printer head to form the predetermined pattern on the recordable paper, makes the scanning module scan the predetermined pattern recorded on the recordable paper, compares the scanned pattern data with the reference data stored in the ROM to calculate amount of image errors, detects amount of corrections corresponding to the amount of the image errors from the correcting table and stores the amount of corrections in the RAM, and corrects the image errors by the amount of the corrections with respect to the document data scanned from the document.

The apparatus according to the second aspect of the present invention further has a rasterizer for rasterizing the document data divided into lines in a sub scanning direction to be divided into lines in a main scanning direction, wherein the control section corrects all lines of the rasterized document data by the amount of the corrections.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIGS. 2A to 2C are schematic views of a shuttle type of a scanner according to the present invention, in which

DESCRIPTION OF THE PREFERRED EMBODIMENT

Hereinafter, an apparatus and a method for correcting image errors in a scanner according to the present invention will be described in detail with reference to accompanying drawings.

Figure 2A:
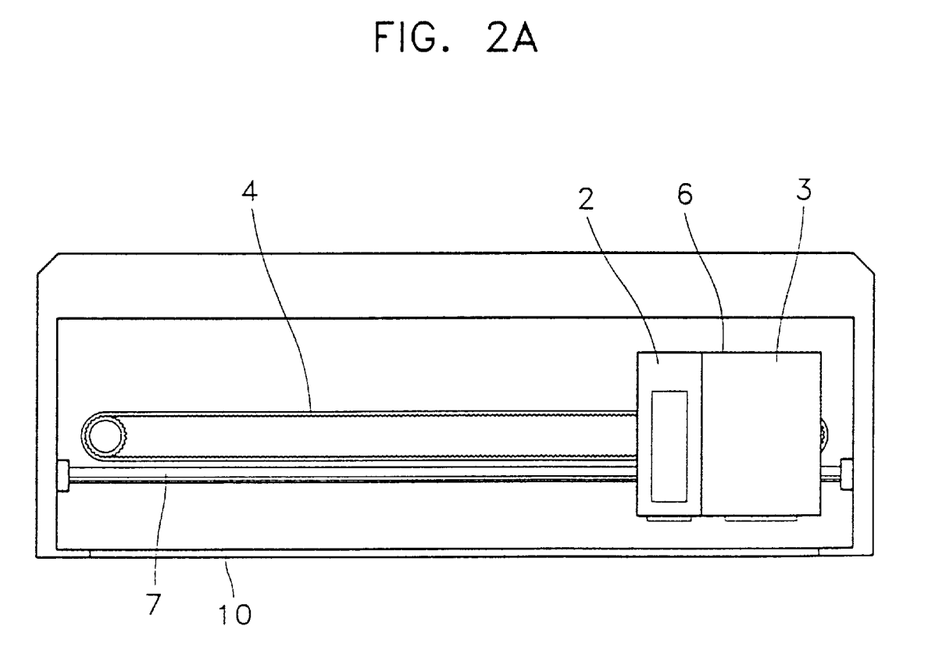
FIG. 2A is a front view of the shuttle type of the scanner.
Figure 2B:
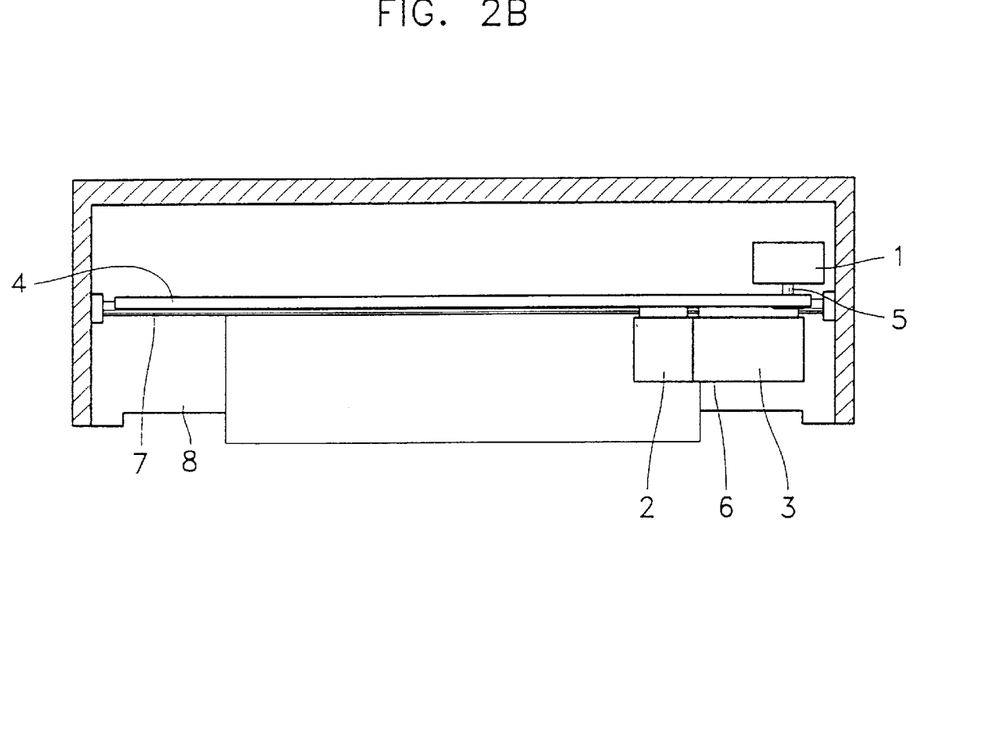
FIG. 2B is a plain view of the shuttle type of the scanner.
Figure 2C:
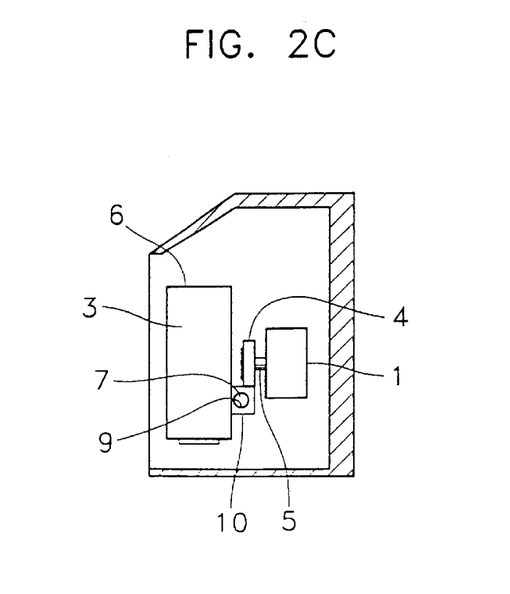
FIG. 2C is a side view of the shuttle type of the scanner.

FIGS. 2A to 2C are schematic views of a shuttle type of a scanner according to the present invention, in which FIG. 2A is a front view of the shuttle type of the scanner, FIG. 2B is a plain view of the shuttle type of the scanner, and FIG. 2C is a side view of the shuttle type of the scanner.

As shown in FIGS. 2A to 2C, a carriage and return motor 1 is mounted at a position adjacent to a scanning and printing areas and provides a driving force for a scanning module 2 so as to be horizontally reciprocated with scanning image data recorded on a document and for a printer head 3 so as to be horizontally reciprocated with printing a predetermined image on a recordable paper.

A conveying belt 4 is mounted on an axis 5 of motor extending from the carriage and return motor 1 and on a supporting body 6 which supports the printer head 3 and the scanning module 2 so as to convert a rotation movement of the carriage and return motor 1 into a linear movement. Thus, the supporting body 6 which supports the printer head 3 and the scanning module 2 can be horizontally reciprocated.

A guiding shaft 7 is mounted to be normal to a moving direction of a document and a recordable paper and guides the supporting body 6 which supports the printer head 3 and the scanning module 2 during reciprocating of the supporting body 6 by means of the conveying belt 4.

The supporting body 6 includes a supporting projection 10 in which a throughhole 9 is formed so that the guiding shaft 7 extends through the throughhole 9. The supporting projection 10 is connected to the conveying belt 4 at a side thereof. Accordingly, the supporting body 6 is reciprocated along the guiding shaft 7 as the conveying belt 4 is driven.

The scanning module 2 is fixedly mounted on the supporting body 6 to be disposed at a side of the printer head 3 and is reciprocated together with the printer head 3 in a normal direction to the moving direction of the document as the conveying belt 4 is driven. The scanning module 2 and the printer head 3 is mounted over a tray 8 on which the document and the recordable paper is moved. The scanning module 2 scans image data from the document while the document is conveyed in a condition that a surface of the document having image data is directed toward the scanning module 2. On the other hand, the printer head 3 prints image data on the recordable paper while the recordable paper is conveyed in a condition that a surface of the recordable paper is directed toward the printer head 3.

Figure 3:
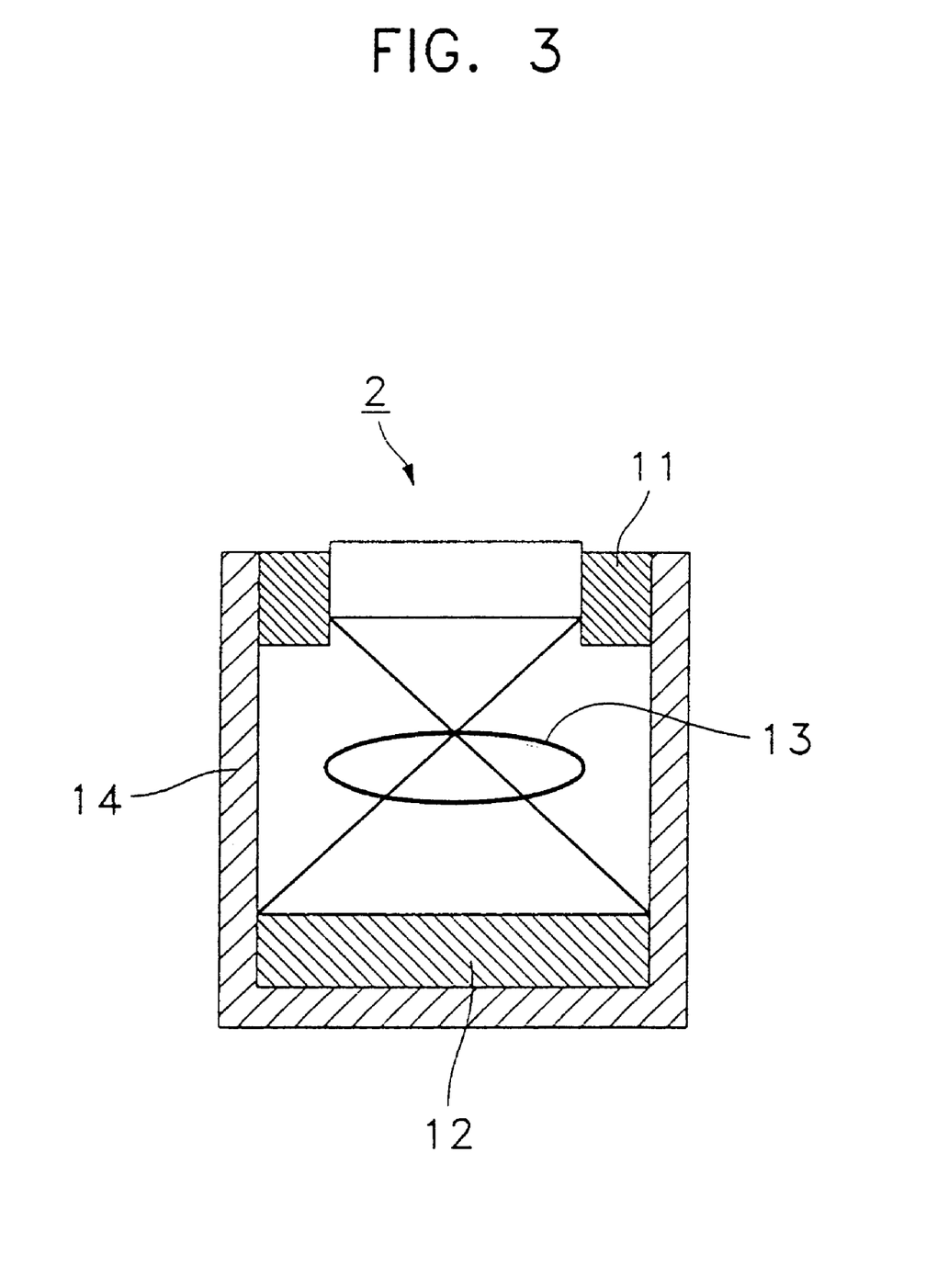
FIG. 3 is a detailed view of a scanning module in the shuttle type of the scanner according to the present invention.

Hereinafter, a structure of the scanning module 2 according to the present invention will be described in detail with respect to FIG. 3.

The shuttle type of the scanning module 2 has a lamp 11 mounted on an upper portion thereof. The lamp 11 emits light to the surface of the document on which the image data are recorded. An image sensor 12 is mounted on a lower portion of the lamp 11, which detects the light reflected by the image data which are recorded on the document and converts the reflected light into an electric signal. A lens 13 is mounted between the lamp 11 and the image sensor 12 to collect the reflected light and enables the reflected light which is reflected by the image data recorded on the document to be received in the image sensor 12. The lamp 11, image sensor 12, and lens 13 are integrated and fixed by a scanning module casing 14.

Figure 4:
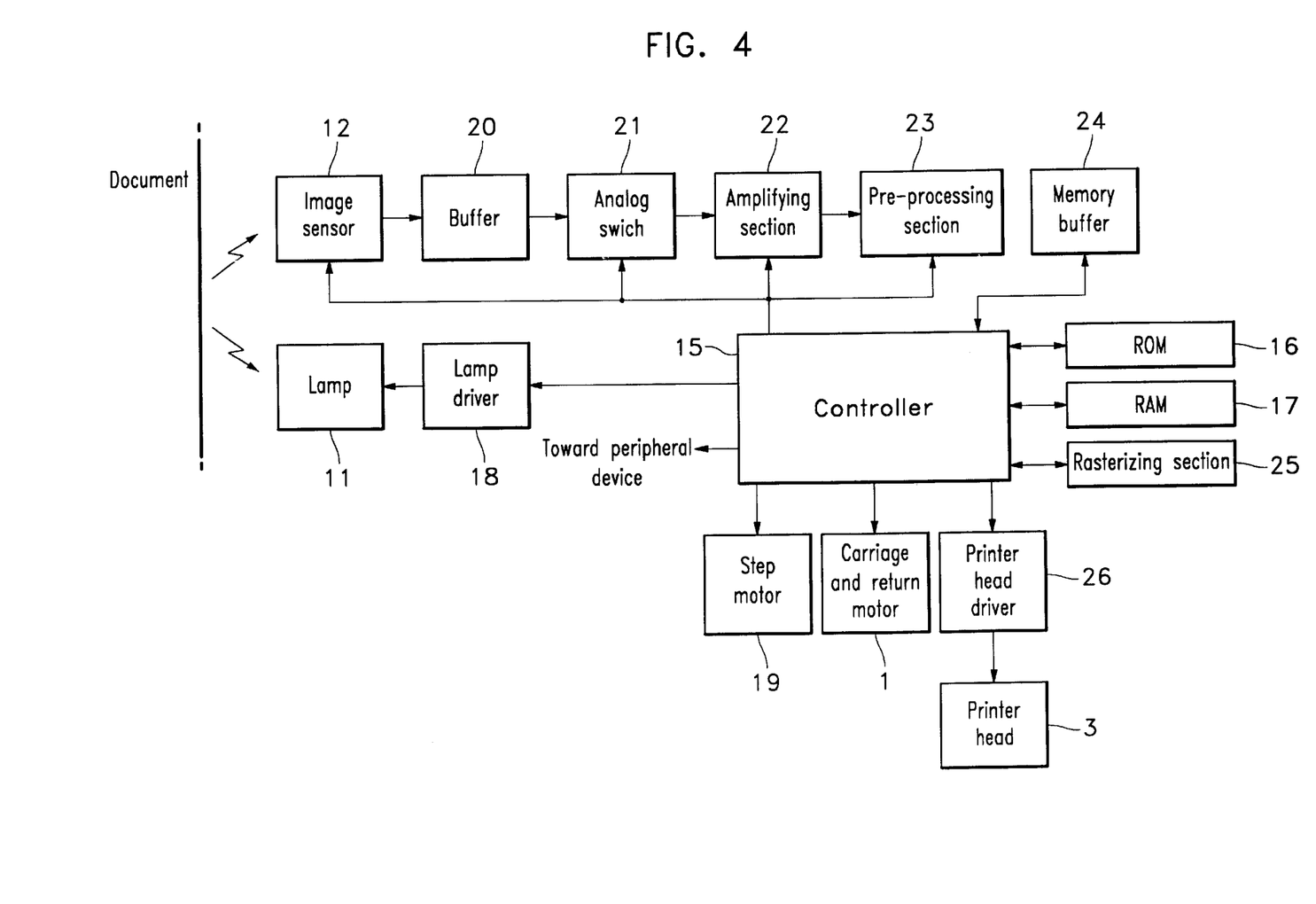
FIG. 4 is a block diagram of an apparatus for correcting image errors in the shuttle type of the scanner according to the present invention.

FIG. 4 is a block diagram of an apparatus for correcting image errors in the shuttle type of the scanner according to the present invention.

A control section 15 controls the scanning module 2 to perform a series of scanning operation while controlling the printer head 3 to print a predetermined pattern. A ROM 16 has a program stored therein to make the control section 15 control the scanning module 2 and the printer head 3 according to desired sequences. The ROM 16 has a correcting table and reference data corresponding to the preset and predetermined pattern to correct errors of the scanned image data. A RAM 17 has temporary data, specially the scanned image data, stored therein, which are generated while the control section 15 controls a system.

The lamp 11 emits the light in order to detect the image data of the document by using the reflected light from the image data of the document. A lamp driver 18 controls a lighting and a putting out of the lamp 1 1 according to a control signal of the control section 15. The image sensor 12 photoelectrically coverts the reflected light from the document into the electric analog signal according to the control signal of the control section 15.

The carriage and return motor 1 makes the scanning module 2 to be reciprocated according to the control signal of the control section 15. A step motor moves the scanning module 2 in a subscanning direction for the document to be in correspondence with a resolution according to the control signal of the control section 15.

A buffer 20 prevents image signal from being distorted while processing the analog image signal photoelectrically converted by the image sensor 12. An analog switch 21 selects an appreciated amplifying extent for the analog image signal which is buffered by the buffer 20 according to the control signal of the control section 15. An amplifying section 22 receives the analog image signal having a low level of voltage from the buffer 20 and amplifies the analog image signal to the extent of amplifying selected by the analog switch 21 so that the analog image signal is processed at a following circuit, for example a pre-processing section 23.

The pre-processing section 23 receives the analog image signal which is amplified by the amplifying section 22 and performs a process of correcting a black and a white. Furthermore, the pre-processing section 23 converts the analog image signal into the digital image data. A memory buffer 24 buffers the digital image signal outputted from the pre-processing section 23 and outputs the digital image signal to peripheral devices such as the RAM 17, a printer, and a computer.

A rasterizer 25 divides the data divided in the subscanning direction in a main scanning direction so that data corresponding to dots can be corrected.

The printer head 3 prints the predetermined pattern corresponding to the preset reference data, while the printer head driver 26 controls the printer head 3.

Hereinafter, a process of correcting image errors in the scanner according to the method of the present invention will be described in detail with reference to FIGS. 5A to 8.

Figure 5A:
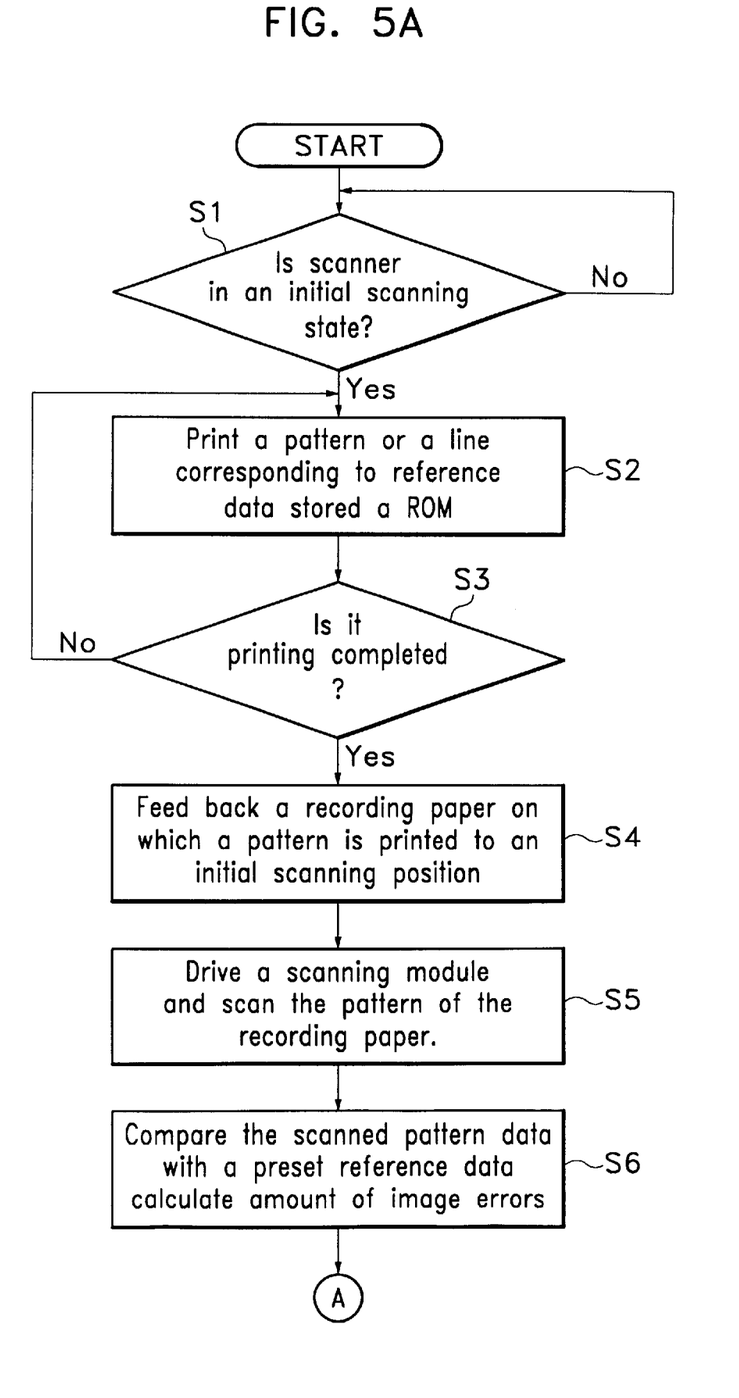
FIGS. 5A and 5B are a flow chart showing a process of correcting the image errors in the shuttle type of the scanner according to the present invention.
Figure 6A:
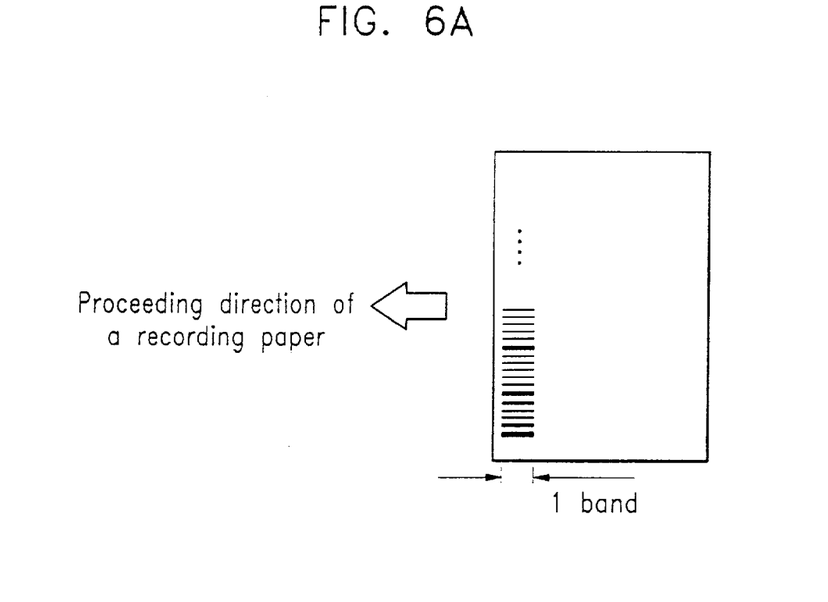
FIGS. 6A and 6B show that a pattern is printed on a recordable paper according to the present invention.
Figure 6B:
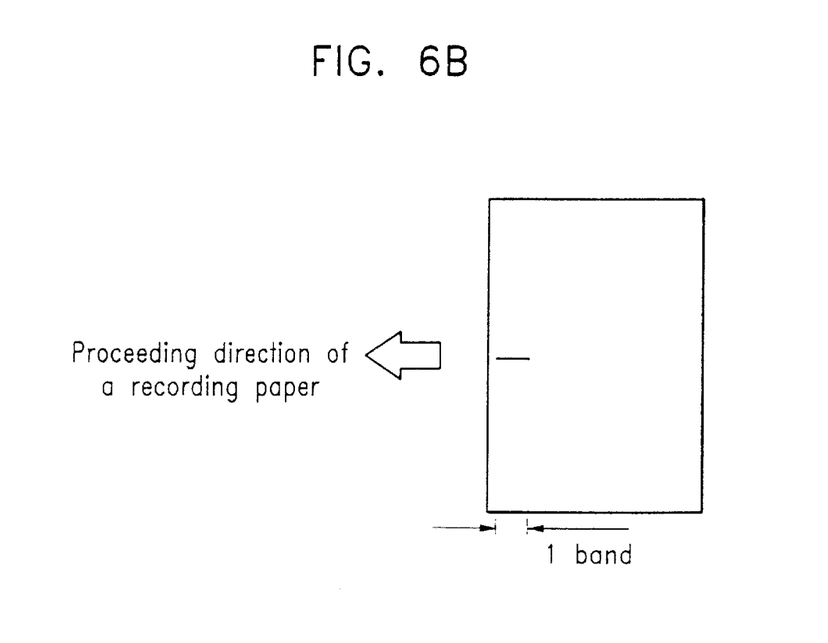
Figure 7A:
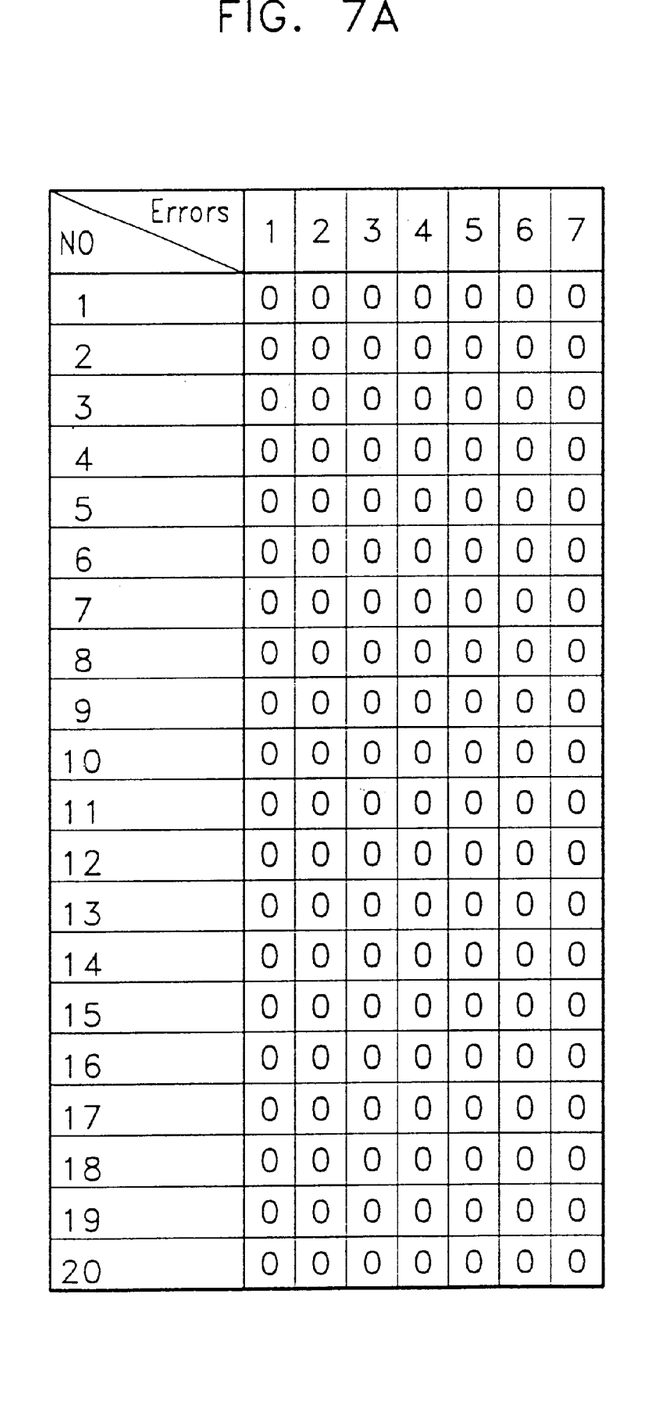
FIGS. 7A to 7D show correcting tables according to the present invention.
Figure 7B:
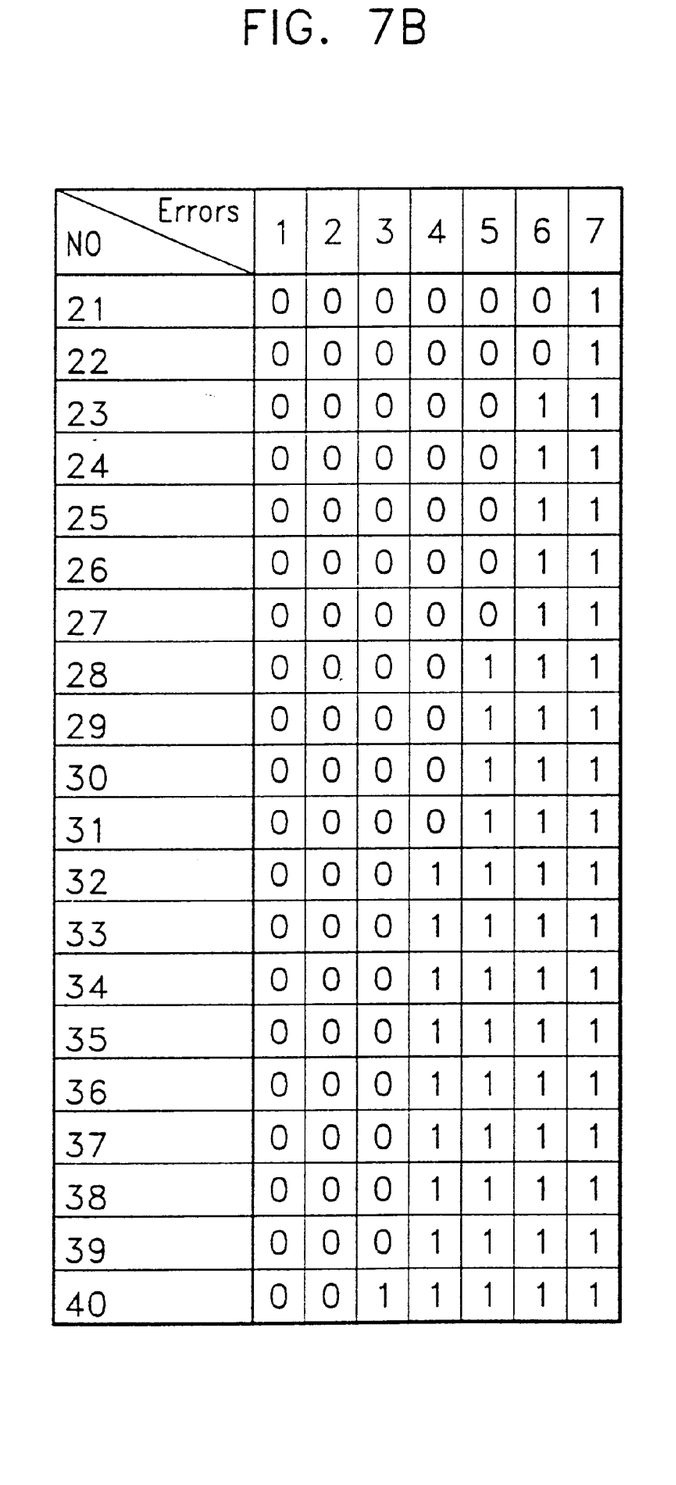
Figure 7C:
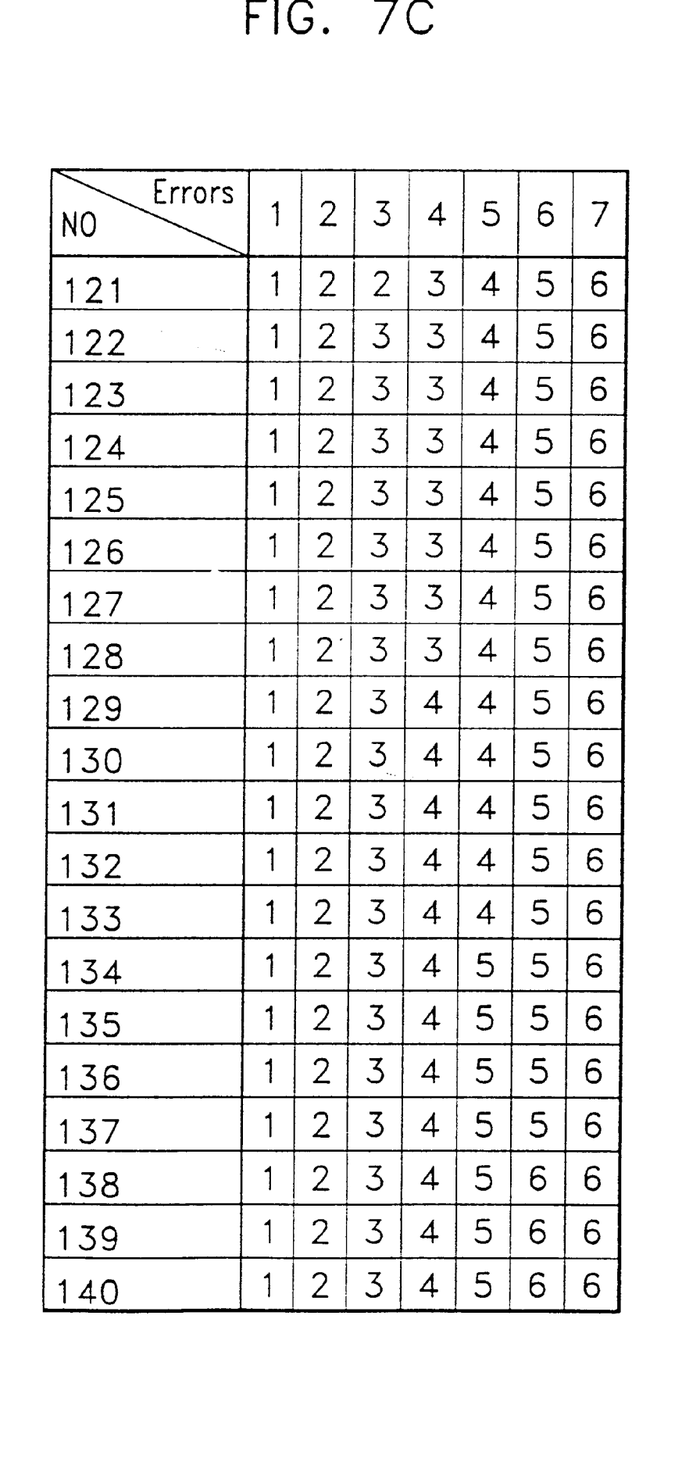
Figure 7D:
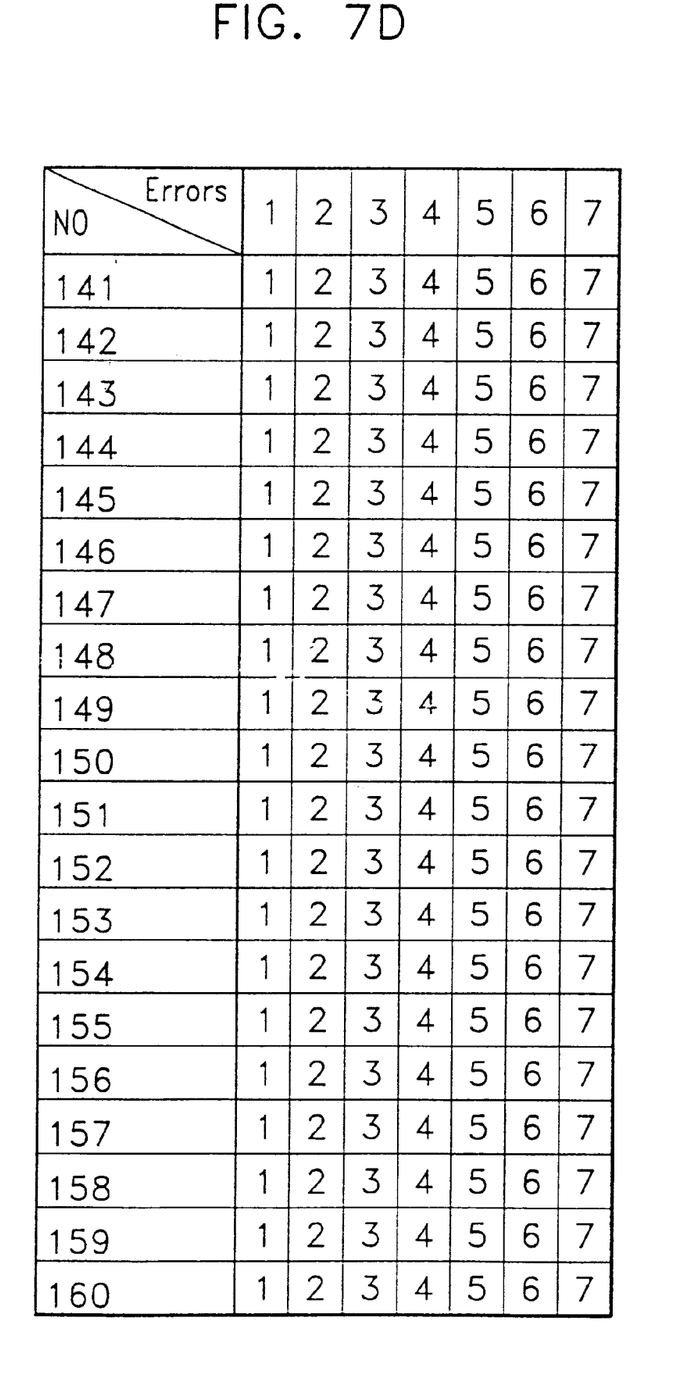

When the scanning is started in the step S1, the control section 15 drives the printer head 3 to print the pattern corresponding to the reference data stored in the ROM 16 in the step S2. The printing of the pattern is as follows:

After the printer head 3 is positioned at the desired position, only one of plural nozzles is made to be operated. When any one of the plural nozzles operates, the step motor 19 is made to convey the recordable paper at a predetermined distance. Thus, it is possible to obtain accurate aligned lines even though the printer head 3 and the scanning module 2 have an alignment tolerance. Furthermore, when a line of pattern is completed, the recordable paper is fed back to be positioned at the initial position and the printer head 3 is moved at a position adjacent to the initial position to print a next line of pattern on the recordable paper. The predetermined patterns are printed on the recordable paper as shown in FIG. 6A by repeating the process as described above. The patterns are held in the accurate straight lines.

The printing of the patterns may be performed in a manner of printing a line of the pattern. That is, when the printer head 3 is made to print a line of the pattern, the pattern is held in an accurate straight line.

When the printing of the pattern is completed, in the step S3, the recordable paper on which the pattern is printed is fed back to be positioned at the initial position, in the step S4. Then, the scanning module 2 is driven to scan the pattern which is printed on the recordable paper, in the step S5.

When a predetermined light is emitted from the lamp 11 to the recordable paper as the control section 15 controls the lamp driver 18 to turn on the lamp 11, the image sensor 12 receives the reflected light, which is reflected by the pattern formed on the recordable paper, through the lens 13. The image sensor 12 converts the reflected light into the electric signal and outputs the electric signal toward the buffer 20. The buffer 20 buffers the electric signal outputted from the image sensor 12. The analog switch 21 selects appropriate extent of amplifying for the electric signal transmitted from the buffer 20 and controls the amplifying section 22. The amplifying section 22 amplifies the electric signal according to the selected extent of the amplifying. The amplified signal is corrected by the pre-processing section 23, which in turn is converted into the digital pattern data. The pattern data is stored through the memory buffer 24 in the RAM 17.

The control section 15 compares the pattern data stored in the RAM 17 with the reference data stored in the ROM 16 and calculates the amount of the image errors in the pattern data with respect to the reference data, in the step S6. The amount of the corrections as shown in FIGS. 7A to 7D are detected by comparing the amount of the image errors with the correcting table and stored in the RAM 17, in the step S7.

FIGS. 7A to 7D show the correcting tables in a case of that a seven types of errors are generated in the pattern data in the main scanning direction. Suppose that one hundred sixties dots are present in each line of a scanning band and a fourth type of error is generated in the pattern data in the main scanning direction, the dots in a line of the scanning band, for example a first dot to an one hundred sixtieth dot, are respectively corrected by numbers of dots corresponding to the fourth type of error on the correcting table. That is, if the fourth type of the error is generated in the pattern data, the one hundred fifty sixth dot is corrected to have amount of four dots in the subscanning direction and the one hundred twenty fifth dot is corrected to have amount of three dots in the subscanning direction.

Figure 8:
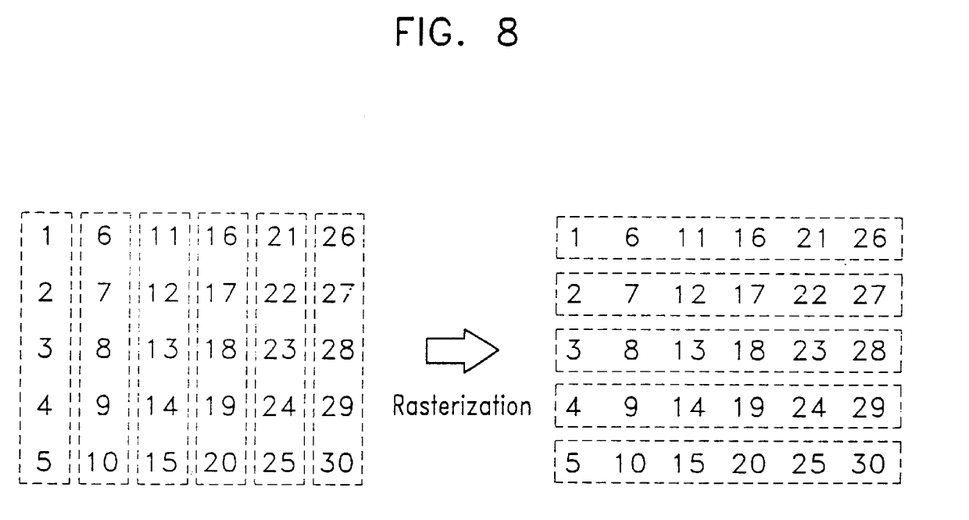
FIG. 8 is a view of illustrating a rasterization of the image errors according to the present invention.

Then, a specified document selected by the user is scanned, in the step S8. The scanned document data are corrected by using the correcting table stored in the RAM 17 in such a manner as described above and processed, in the step S9. Suppose that numbers of dots per each line of the scanning band are five as shown in FIG. 8 when scanning document data from the document, the document data 1, 2, 3, 4, and 5 per each line in the subscanning direction are rasterized by the rasterizer 25 into the document data 1, 6, 11, 16, 21, 26, and so on per each line in the main scanning direction.

Such converted document data are corrected by numbers of dots corresponding to each type of error on the correcting table as described above.

In the case of that the fourth dot in the subscanning direction is corrected by three dots in the main scanning direction, for example, each rasterized document data on the fourth line in the subscanning direction is corrected by three dots in the main scanning direction.

Figure 5B:
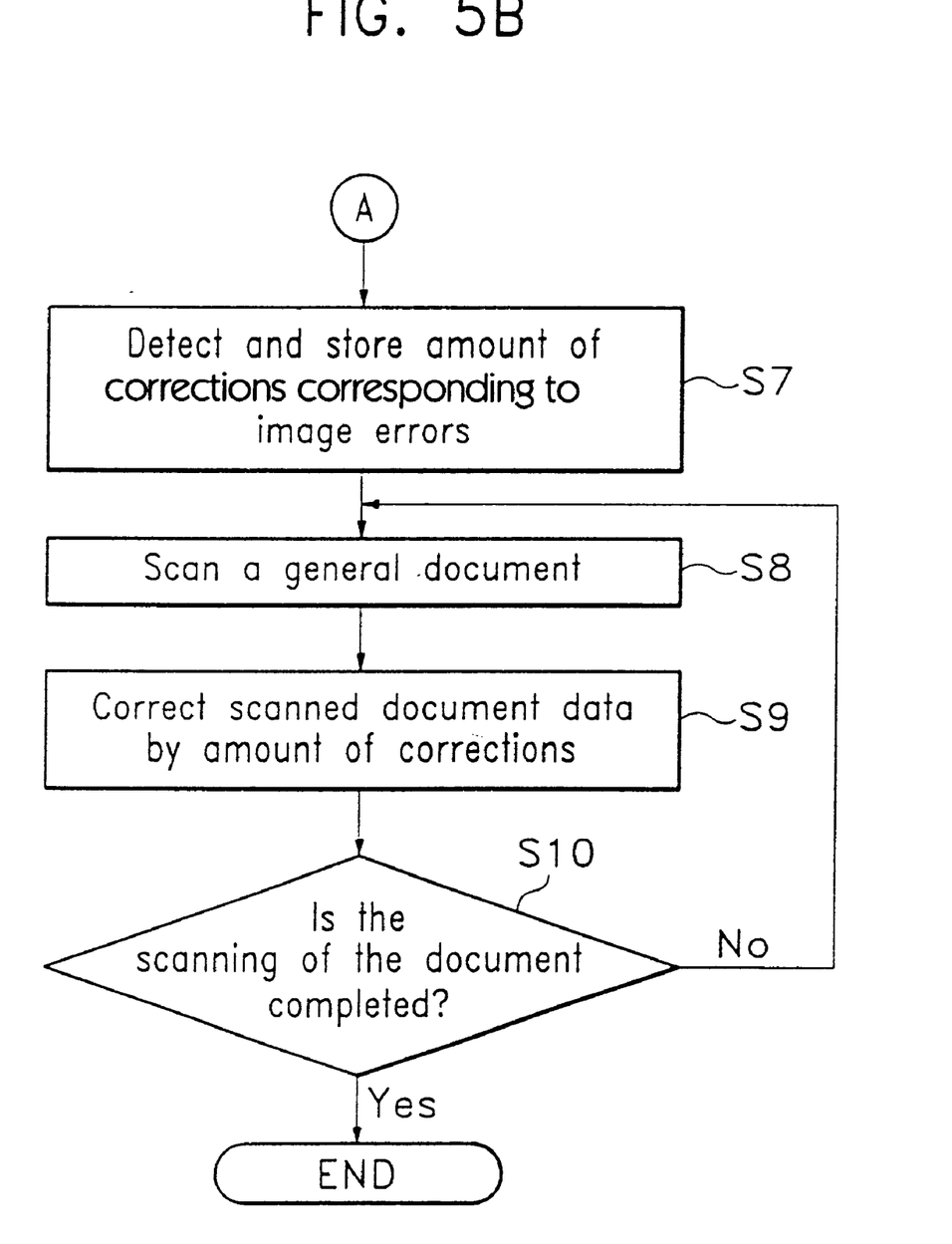

The control section 15 checks whether the scanning is completed, in the step S10. If the scanning is not completed, the control section 15 returns the step S8 and repeatedly performs the steps after the step S8. If the scanning is completed, the control section 15 finishes the process of correcting image errors.

As described above, the stable scanned data can be always obtained by detecting the amount of the corrections from the correcting table, corresponding to the image errors which are generated due to the mechanical tolerance or the inertia tolerance of the scanning module and correcting the rasterized document data a line by line according to the amount of the corrections.

As described above, when the scanning is started, the pattern may be always printed and the printed pattern is scanned. Furthermore, the user can select the time for printing the pattern and the time for scanning the printed pattern.

Moreover, the amount of the corrections as shown in the correcting table can be changed according to the type and the operation principle of the scanning module. The changes are considered in the scope of the present invention.

In the apparatus and the method for correcting the image error in the shuttle type of the scanner, as described above, the predetermined pattern are printed on the recordable paper in order to correct the image errors during the scanning. Then, after the printed pattern is scanned and the amount of the image errors is calculated, the amount of corrections corresponding to the amount of the image errors is detected. Finally, the document data which are obtained by scanning the document are corrected by the amount of the corrections. The errors generated during the process of the data can be corrected.

Since the correction of the image errors can be accomplished in such a manner as described above, the process of producing the scanner can be simple, resulting in facilitating to assemble the scanner. Accordingly, the productivity of the scanner can be improved.

Furthermore, it is possible to correct the image errors which are generated during the use of the scanner in the same manner as described above. Accordingly, the stable scanned data can be always obtained and the reliability of the product can be improved.

While the present invention has been particularly shown and described with reference to a particular embodiment thereof, it will be understood by those skilled in the art that various changes in form and detail may be effected therein without departing from the scope of the invention as defined by the appended claims.

What is claimed is:

1. A method for correcting image errors in a shuttle type of a scanner, comprising the steps of:
   printing a predetermined pattern on a recordable paper, during which a printing operation is performed by moving the recordable paper at a predetermined distance in a normal direction to a moving direction of a printer head in a state that the printer head stays at a predetermined position;
   scanning the predetermined pattern which is printed in the printing step to produce pattern data and storing the pattern data;
   comparing the pattern data with a preset reference data and calculating amount of image errors;
   detecting amount of corrections corresponding to the amount of image errors from a correcting table which is preset and storing the amount of the corrections; and
   scanning a document and correcting scanned document data by the amount of the corrections.

2. A method for correcting image errors in a shuttle type of a scanner as claimed in claim 1, further comprising moving the recordable paper in a reverse direction against the proceeding direction of the recordable paper in the printing step and setting the recordable paper in an initial position after the printing operation is completed.

3. A method for correcting image errors in a shuttle type of a scanner as claimed in claim 2, further comprising moving the printer head at a predetermined distance in a horizontal direction, wherein the printing step and the initial position setting step are repeatedly performed until the pattern in a scanning band is printed on the recordable paper after the moving step.

4. A method for correcting image errors in a shuttle type of a scanner as claimed in claim 1, wherein the predetermined pattern has a straight line.

5. A method for correcting image errors in a shuttle type of a scanner as claimed in claim 1, wherein the predetermined pattern is defined to be distinguished from a general data and has a plurality of straight lines.

6. A method for correcting image errors in a shuttle type of a scanner as claimed in claim 1, wherein the reference data are data when the predetermined pattern is scanned without errors.

7. A method for correcting image errors in a shuttle type of a scanner as claimed in claim 1, wherein in the step of correcting the scanned document data, the scanned data are rasterized and the rasterized document data are all corrected by the amount of the corrections.

8. A method for correcting image errors in a shuttle type of a scanner as claimed in claim 7, wherein the scanned document data are rasterized in a state that the scanned document data divided into lines in a subscanning direction are divided into lines in a main scanning direction.

9. A method for correcting image errors in a shuttle type of a scanner as claimed in claim 1, wherein a point at which the printing to storing steps are performed includes a starting point at which a scanning operation is started.

10. A method for correcting image errors in a shuttle type of a scanner as claimed in claim 1, wherein a point at which the printing to storing steps are performed includes a point at which a requirement of a user is received.

11. An apparatus for correcting image errors in a shuttle type of a scanner, comprising:
   a scanning module for scanning a document data recorded on a document and a predetermined pattern recorded on a recordable paper;
   a printer head for printing the predetermined pattern on the recordable paper;
   a control section for controlling an operation of the scanning module to perform a series of scanning operations while controlling an operation of said printer head to perform printing;
   a ROM for storing a program so that the control section controls the scanning module and the printer head according to a desired sequence while storing a correcting table and a preset reference data to correct errors of scanned image data; and
   a RAM for storing the image data which are scanned by means of the scanning module,
   wherein the control section enables the printer head to print the predetermined pattern on the recordable paper during which a printing operation is performed by moving the recordable paper at a predetermined distance in a normal direction to a moving direction of the printer head in a state that the printer head stays at a predetermined position, makes the scanning module scan the predetermined pattern recorded on the recordable paper, compares the scanned pattern data with the reference data stored in the ROM to calculate an amount of image errors, detects amount of corrections corresponding to the amount of the image errors from the correcting table and stores the amount of corrections in the RAM, and corrects the image errors by the amount of the corrections with respect to the document data scanned from the document.

12. The apparatus for correcting image errors in a shuttle type of a scanner as claimed in claim 11, wherein the predetermined pattern has a straight line.

13. The apparatus for correcting image errors in a shuttle type of a scanner as claimed in claim 11, wherein the predetermined pattern is defined to be distinguished from a general data and has a plurality of straight lines.

14. The apparatus for correcting image errors in a shuttle type of a scanner as claimed in claim 11, wherein the reference data are data when the predetermined pattern is scanned without errors.

15. The apparatus for correcting image errors in a shuttle type of a scanner as claimed in claim 11, further comprising a rasterizer for rasterizing the document data divided into lines in a subscanning direction to be divided into lines in a main scanning direction, wherein the control section corrects all lines of the rasterized document data by the amount of the corrections.

16. The apparatus for correcting image errors in a shuttle type of a scanner as claimed in claim 11, wherein a detecting point at which the amount of corrections are detected includes a starting point at which a scanning operation is started.

17. The apparatus for correcting image errors in a shuttle type of a scanner as claimed in claim 11, wherein a detecting point at which the amount of corrections are detected includes a point at which a requirement of a user is received.

* * * * *